Figure 1:
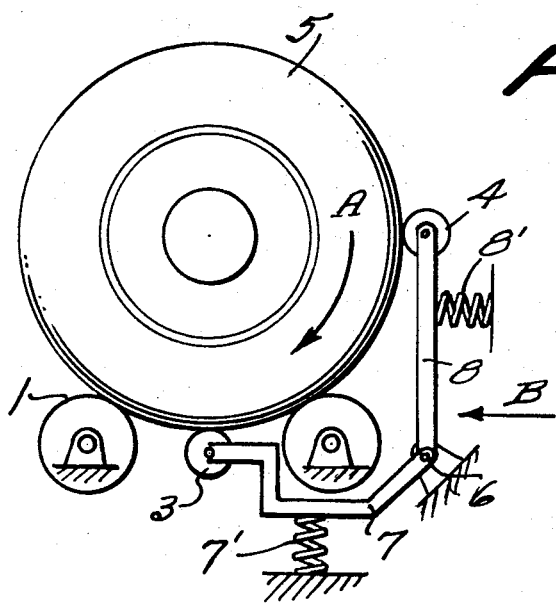

United States Patent [19]
Hegenbart

[11] 3,871,106
[45] Mar. 18, 1975

[54] METHODS AND APPARATUSES FOR DYNAMIC AXLE ANGLE MEASUREMENT ON MOTOR VEHICLES

[75] Inventor: Horst Hegenbart, Bensheim/Schwanheim, Germany

[73] Assignee: Gebr, Hofmann KG, Darmstadt, Germany

[22] Filed: June 12, 1973

[21] Appl. No.: 369,392

[30] Foreign Application Priority Data
June 14, 1972 Germany............................ 2228988

[52] U.S. Cl. .......................................... 33/203.13
[51] Int. Cl. ..................... G01b 5/255, G01b 7/315
[58] Field of Search............ 33/203, 203.12, 203.13, 33/203.14

[56] References Cited
UNITED STATES PATENTS
| | | | |
|---|---|---|---|
| 2,601,187 | 6/1952 | Volis................................ | 33/203.13 |
| 3,187,440 | 6/1965 | Merrill et al...................... | 33/203.13 |
| 3,208,154 | 9/1965 | Pancoast........................... | 33/203.13 |
| 3,453,740 | 7/1969 | Sakamoto.......................... | 33/203 X |

Primary Examiner—William D. Martin, Jr.
Attorney, Agent, or Firm—Cushman, Darby and Cushman

[57] ABSTRACT

A method and apparatus for dynamic axle angle measurement in which a pair of sensing rollers with axes in parallel engage the tire tread during rotation and are displaced along their axes according to camber and/or track alignment angle. The displacement of the sensing rollers along the axes is sensed, pneumatically or otherwise, and the axes of the sensing rollers are then adjusted until the axes extend parallel to the wheel axis and displacement ends, that adjustment indicating camber and/or track alignment angle.

8 Claims, 4 Drawing Figures

METHODS AND APPARATUSES FOR DYNAMIC AXLE ANGLE MEASUREMENT ON MOTOR VEHICLES

BRIEF DESCRIPTION OF THE PRIOR ART AND SUMMARY OF THE INVENTION

This invention relates to methods and apparatuses for dynamic axle angle measurement on motor vehicles.

To achieve the best driving characteristics in motor vehicles, it is necessary for the vehicle wheels to be set in precisely determined positions relative to each other and to the vehicle. These positions can be determined by means of mechanical, optical or electrical axle angle measuring devices. By means of an adaptor, such as a mirror, projector or measuring plate, which is set up on the respective wheel axle, such devices can measure the angular position of the individual wheel axle with respect to the vertical, that is, they determine the camber angle of the wheel, and in a horizontal plane relative to each other, this being the track alignment of the wheels. However, the measuring operation usually requires a relatively long period of time, as the adaptor must be fitted individually to each wheel, while the vehicle also has to be set in an aligned position relative to the measuring device. The above-mentioned devices also suffer from a common disadvantage, namely that the wheels are stationary during the measuring operation.

According to the present invention, there is provided a method of dynamic axle angle measurement in a motor vehicle, comprising rotating a wheel with tire to be measured, applying sensing rollers to the thread surface with the sensing rollers being maintained parallel to each other, a camber angle and/or track alignment angle of the wheel causing simultaneous displacement of the sensing rollers to a displaced position in which the sensing rollers lie parallel to the wheel rotational axis; and determining camber angle and/or track alignment angle from the displaced position of the sensing rollers or from means causing said displacement of the sensing rollers.

In another aspect, the invention also provides apparatus for dynamic axle angle measurement in a motor vehicle, comprising rotatable rollers for supporting a wheel with tire to be measured, a universally movably suspended sensing roller assembly comprising a plurality of sensing rollers, each of which in operation is applied against the tire tread surface whereby a camber angle and/or track alighment angle of the wheel causes the sensing rollers to be displaced jointly to a position in which the sensing rollers lie parallel to the wheel rotational axis, and measuring means for determining and indicating the camber angle and/or track alignment angle in dependence on such displacement of the sensing rollers.

Figure 2:
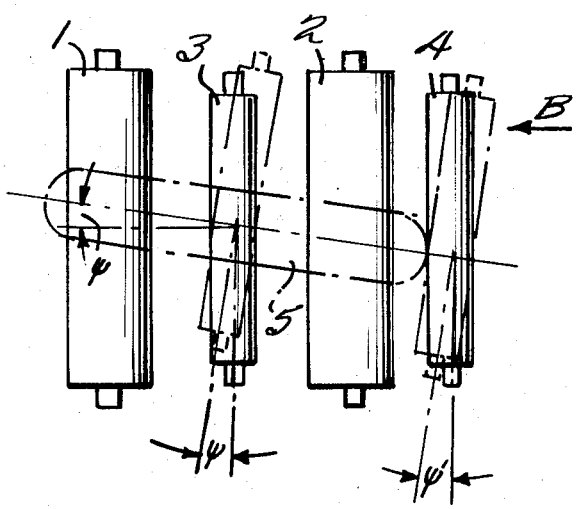
Figure 3:
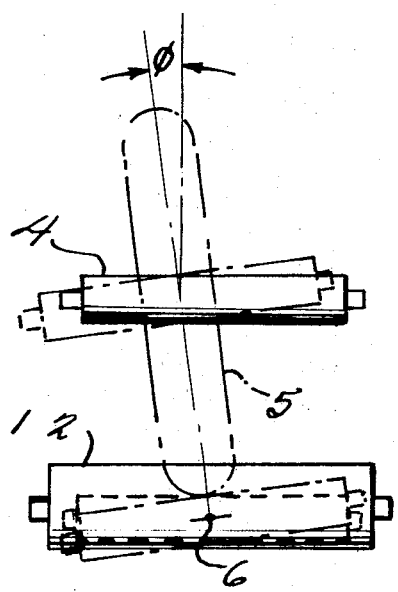
Figure 4:
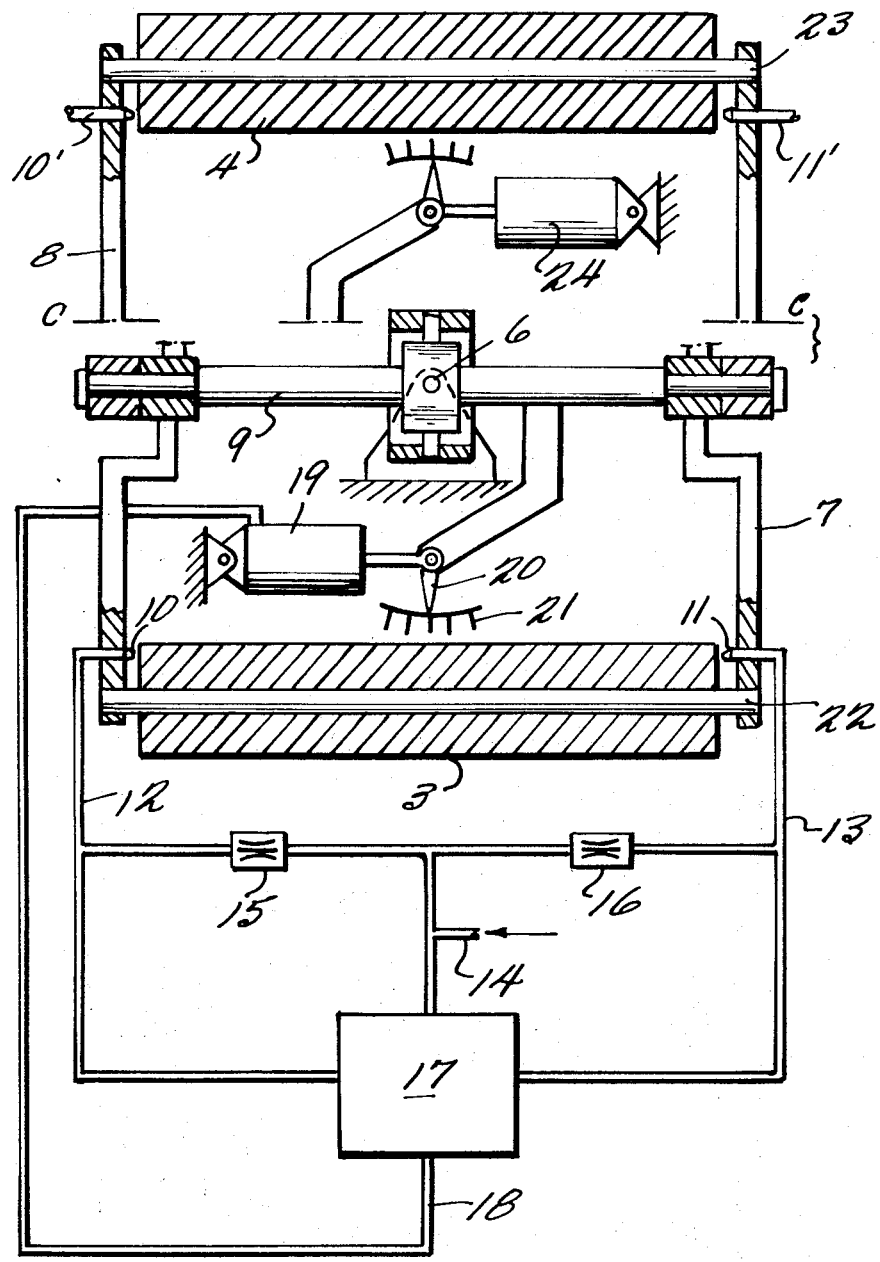

A method and an apparatus according to the present invention will now be described by way of example with reference to the accompanying drawings, in which:

FIG. 1 is a diagrammatic side view of part of the apparatus,

FIG. 2 shows a plan view of the position of the rollers of the apparatus of FIG. 1, with the sensing rollers arranged with their axes parallel, FIG. 3 shows an end view of the position of the rollers of the apparatus of FIG. 1, with the sensing rollers arranged with their axes parallel, and FIG. 4 shows a diagrammatic general view of the apparatus with a pressure conduit system, a pneumatic regulator and displacement members.

Referring to FIGS. 1 to 3, the apparatus includes a pair of rotatable support rollers 1 and 2 whose position in the apparatus is fixed, and sensing rollers 3 and 4 for sensing the track alignment and camber of a wheel 5 on the rollers 1 and 2. The sensing rollers 3 and 4 are arranged at the free ends of respective pairs of pivotal support arms 7 and 8 which at their ends remote from the respective rollers 3 and 4 are pivotally connected to a fixed part of the apparatus by means of a common Cardanic or universally movable suspension point 6, so that the arms 7 and 8 can be pivoted about the point 6 in two planes. For the sake of clarity, the pairs of arms 7 and 8 and the support means for the rollers 1 to 4 are not shown in FIGS. 2 and 3.

The fixed rollers 1 and 2 are arranged with their axes parallel to each other, and their axes lie precisely horizontally in one plane. It is also possible to provide four such rollers on the measuring stand of the apparatus. The height of the rollers 1 and 2 is such that a vehicle supported thereon is horizontal, after having been driven onto the rollers. The rollers 1 and 2 are rotated by an outside drive so as to simulate for the wheel 5 supported on the rollers, a given direction of travel of the vehicle; alternatively, when measuring a driven axle, the wheels of the vehicle can be rotated at a constant speed by the engine of the motor vehicle.

Operating conditions simulating those encountered when driving on a road are therefore created, and the vehicle will automatically align itself with its longitudinal center line perpendicular to the axes of the rollers 1 and 2. The two sensing rollers 3 and 4 are pressed against the tread surface of the wheel 5 to be measured, one sensing roller 3 being positioned as centrally as possible below the wheel 5, while the second sensing roller 4 lies in front of or behind the wheel 5, as close as possible to the level of the wheel axle. The sensing rollers 3 and 4 are also carried by the arms 7 and 8 in such a way that their axes are parallel to each other, and rollers 3 and 4 can be deflected resiliently downwardly, or forwardly or rearwardly respectively, against the action of springs 7' and 8'. As the rollers 3 and 4 are universally movably suspended at the common suspension point 6 by way of the arms 7 and 8, the rollers 3 and 4 can be moved jointly into any angular position.

Each of the sensing rollers 3 and 4 is also displaceable in its axial direction with respect to its mounting in the respective arms 7 and 8. This axial displacement from a central position can be measured for example electrically, pneumatically or hydralically. Axial displacement of one or both of the rollers 3 and 4 will occur, during rotation of the wheel 5, when the axis of the or each sensing roller is not parallel to the axis of rotation of the wheel 5.

The roller 3 which is arranged below the wheel 5 will be displaced in its axial direction primarily by the track alignment angle, while the roller 4 which is arranged in front of or behind the wheel 5 will be displaced in its axial direction primarily by the camber angle of the wheel 5. Such displacement will occur as long as the axis of wheel rotation and the axis of the respective sensing roller are not parallel to each other. If it is assumed that the rotating wheel 5 has only a track angle, but not a camber angle, then, with the rollers 1 and 2 rotating and the wheel 5 turning in the direction of the arrow A, the sensing roller 3 below the wheel will be displaced for example towards the right, as viewed in the direction indicated by the arrow B in FIGS. 1 and 2. A control device of the apparatus (not shown in FIGS. 1 to 3) will be actuated by such displacement to cause the sensing roller assembly, comprising the rollers 3 and 4 and the arms 7 and 8, to be turned about a vertical axis in a clockwise direction in FIG. 2. Thus, both the rollers 3 and 4 will be turned, with their axes being maintained parallel to each other by means of the arms 7 and 8. This rotation in the clockwise direction, or control movement, continues until the axes of the rollers 3 and 4 lie parallel to the axis of the wheel 5. The deflection angle $\psi'$ of the roller axes from the position of the axes before the beginning of the measuring operation corresponds to the track angle $\psi$ of the wheel axis.

If the axis of the wheel 5 also has a camber angle $\phi$ (FIG. 3), when the wheel 5 is rotated the sensing roller 4 will be displaced towards the right, as viewed in the direction of the arrow B in FIGS. 1 and 2. This displacement actuates the control device to cause rotation about a horizontal axis of the sensing roller assembly (sensing rollers 3 and 4, and arms 7 and 8), until the axes of the sensing rollers 3 and 4 are again parallel to the wheel axis.

This adjustment of the axes of the rollers 3 and 4 towards a position in which they are parallel to the axis of the rotating wheel 5, continues until axis parallelism is achieved. Both the first and the second control movements of the sensing roller assembly occur simultaneously. The track and camber angle of each individual wheel of a vehicle can thus be indicated, on the basis of the position of the axes of the rollers 3 and 4.

FIG. 4 diagrammatically shows an embodiment of the control and measuring device in conjunction with the two rollers 3 and 4. As illustrated, the assembly comprising the roller 3 with arms 7 and associated components is shown in plan view, while the part above the line C-C, being the assembly comprising the roller 4 with arms 8 and associated components, has been turned through 90° to lie in the plane of the drawing.

The arms 7 and 8 are carried on a common pivot shaft 9 which is universally movably mounted at the gimbal mounting point 6, and is pivotal about two axes, as diagrammatically shown in detail in FIGS. 2 and 3. The rollers 3 and 4 are displaceable in the direction of their axes on mounting shafts 22 and 23 between the arms 7 and 8 respectively. In a measuring operation the wheel 5 supported on the apparatus exerts lateral forces on the rollers 3 and 4, depending on the particular position of inclination of the wheel axis relative to the respective roller 3 or 4, and thus displaces the rollers 3 and 4 from a central position between the arms 7 and 8. When one of the rollers 3 or 4 is displaced, the control and measuring device is set in operation. This device will now be described in further detail with reference to FIG. 4.

The device includes pressure conduits 12 and 13 terminating in impingement nozzles 10, 10' and 11, 11' directed onto the end faces of the respective rollers 3 and 4. The conduits 12 and 13 are connected to a common pneumatic regulator 17 which operates with a P- or PI-characteristic. The outlet 18 of the regulator 17 is connected to a pneumatically actuatable displacement member 19, such as a piston-cylinder unit. The conduits 12 and 13 are also connected to an inlet 14, through which air flows at a constant pressure into the conduit system, the inlet air flowing through throttle 15 and 16 in the conduits 12 and 13 and arriving at the nozzles 10 and 11. At the same time the inlet air is also fed to a conventional pneumatic regulator 17.

The mode of operation of the conduit and pressure regulating system will now be described in greater detail by reference to displacement of the roller 3. When the roller 3 is displaced for example towards the left in FIG. 4 towards the nozzle 10, the pressure in the conduit 12 rises due to the proximity of the roller 3 restricting the discharge of air from the nozzle 10, while the pressure in the conduit 13 falls. Because of the P- or PI-characteristic of the regulator 17, the regulator 17 changes the displacing pressure at its outlet 18, until the two pressures obtaining in the conduits 12 and 13 become equal. The displacing pressure at the outlet 18 is passed to the displacement member 19 which converts the pressure from the outlet 18 into a travel movement which is proportional to that pressure, rotating the sensing roller assembly in the appropriate direction. This rotation continues until there is no longer any displacement at the roller 3, that is to say, until the axis of the roller 3 lies parallel to the axis of the rotating wheel 5.

When the above-described pressure regulating operation is completed, the angle of displacement of the sensing roller axis about the vertical axis, which angle then also corresponds to the track angle of the vehicle wheel 5, can then be read off by means of a pointer 20 against a track alignment scale 21. It is possible for the position indication to be provided in other ways, for example by indicating the pressure at the outlet 18 on a suitably graduated scale.

The roller 4 is associated with similar measuring and displacing members to those described above in connection with the roller 3, namely nozzles 10' and 11' connected to the conduits 12 and 13, and a displacement member 24 controllable by the regulator 17 and outlet 18 to rotate the roller 4 with the arms 8. The above-described two regulating means and measuring systems for the track alignment and camber angle of the wheel operate simultaneously, and any errors which have a reaction effect on one plane, due to the movement in the other plane, are therefore immediately corrected by displacement in the first-mentioned plane.

The measurement values obtained correspond in practice to the actual conditions, as are measured under simulated operating conditions of the vehicle. In addition, with a suitably automated apparatus, the time for a measuring operation can be substantially reduced, and this can be achieved without exertion on the part of the tester. This can therefore ensure that even in testing locations which have a high rate of vehicle throughput, each vehicle can be rapidly and reliably tested. The rapidity of testing is also due to the fact that there is no need for an adaptor to be fitted to each wheel, or for the vehicle to be aligned relative to the apparatus.

Many changes and modifications of the above-described embodiments of the invention can of course be carried out without departing from the spirit of this invention. Accordingly, the scope of this invention is intended to be limited only by the scope of the appended claims.

What is claimed:

1. A method of dynamic axle angle measurement in a motor vehicle, comprising:
rotating a wheel with tire to be measured;
applying first and second sensing rollers to the tread surface with one of the sensing rollers engaging the tread surface adjacent to a horizontal plane containing the wheel axis with the sensing rollers being maintained parallel to each other so that the camber angle of the wheel causes displacement of said other sensing roller along its axis and said track alignment angle cause simultaneous displacement of said one roller to displaced positions in which the sensing rollers lie parallel to the wheel rotational axis; and
determining camber angle and/or track alignment angle from the displaced positions of the sensing rollers.

2. A method according to claim 1 wherein the displacement of the or each sensing roller into said displaced position is effected by lateral forces applied to each sensing roller by the wheel rotating with a camber angle and/or track alignment angle.

3. A method according to claim 2 wherein the displacement of each sensing roller into the displaced position is effected in dependence on displacement of the sensing roller or rollers in its or their axial direction.

4. A method according to claim 1 wherein displacement of each sensing roller in its respective axial direction, such displacement being caused by a camber angle and/or track alignment angle of the wheel, causes a change in pressure in a pressure conduit system, which change in pressure is operative by way of a regulator and actuating means to cause the sensing roller assembly to be rotated to its displaced position.

5. Apparatus for dynamic axle angle measurement in a motor vehicle, comprising:
rotatable rollers for supporting a wheel with tire to be measured,
a universally movably suspended sensing roller assembly comprising first and second sensing rollers, each of which in operation is applied against the tire tread surface whereby a camber angle and/or track alignment angle of the wheel causes the sensing rollers to be displaced jointly to a position in which the sensing rollers lie parallel to the wheel rotational axis, one of said sensing rollers being mounted below said tire and the other sensing roller being mounted adjacent to a horizontal plane containing the wheel axis and
measuring means for determining and indicating the camber angle and/or track alignment angle in dependence on such displacement of the sensing rollers.

6. Apparatus according to claim 5 wherein said measuring means is operative to determine and indicate said angle or angles in dependence on means for displacing the sensing rollers to said displaced position.

7. Apparatus according to claim 5
wherein said roller assembly includes carrier means carrying the two sensing rollers and holding them interconnected with their axes parallel to each other, each sensing roller being displaceable in its axial direction relative to the carrier means, the carrier means being so arranged that in operation one sensing roller is applied to the tire tread surface from below and the other sensing roller is applied to the tread surface from the front or from the rear, as viewed in the simulated direction of travel of the rotating wheel, and
further including means for displacing the carrier means of the respective sensing rollers to move each sensing roller into its said displaced position, and control means for actuating the displacing means in dependance on said axial displacement of each said sensing roller.

8. Apparatus according to claim 7 wherein the displacing means is pneumatically actuatable and the control means comprises pneumatic regulator means having an outlet connected to the displacing means, and a pressure conduit system also connected to the regulator means and having air-flow outlets positioned relative to respective sensing rollers such that said axial displacement of each sensing roller causes in the conduit system a variation in pressure which acts on the regulator means to produce at the regulator means outlet an adjusting pressure capable of actuating said displacing means to displace the respective associated sensing roller carrier means.

* * * * *